(Model.)
F. A. NORTH.
Feed Rack.
No. 241,234. Patented May 10, 1881.
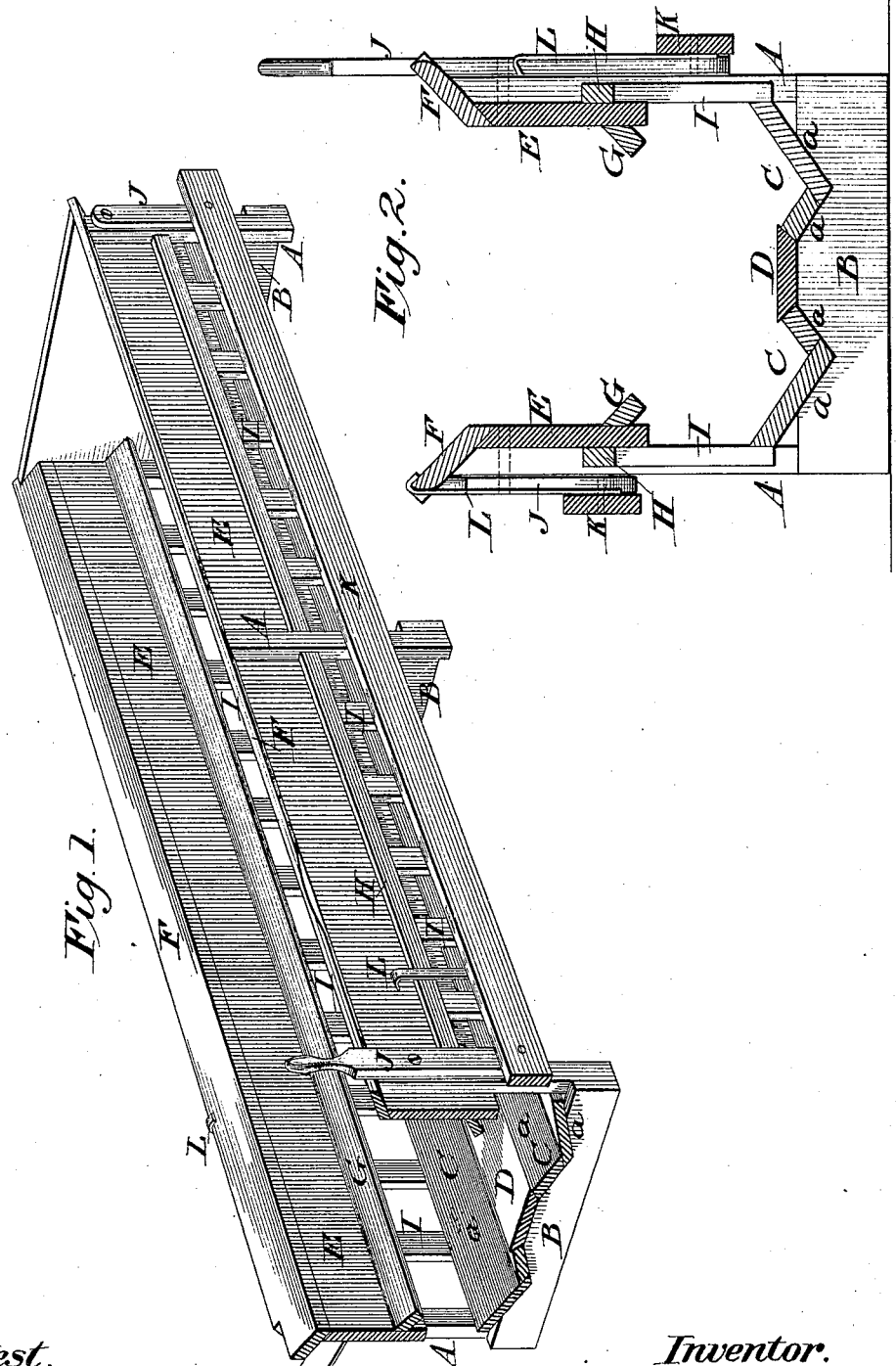
Attest.
Sidney P. Hollingsworth
Walter S. Dodge
Inventor.
F. A. North
By Dodge Son
Attys.

UNITED STATES PATENT OFFICE.

FREDERICK A. NORTH, OF EASTON, MICHIGAN.

FEED-RACK.

SPECIFICATION forming part of Letters Patent No. 241,234, dated May 10, 1881.

Application filed February 3, 1881. (Model.)

*To all whom it may concern:*

Be it known that I, FREDERICK A. NORTH, of Easton, in the county of Ionia and State of Michigan, have invented certain Improvements in Feeding-Racks for Sheep, &c., of which the following is a specification.

My invention relates to a rack of peculiar construction designed for the purpose of feeding sheep and other animals, the structure being designed with special reference to an equal distribution of the feed, to the protection of the attendant from the animals, and to the points of cheapness, durability, and facility of operation.

The construction and operation of the rack will be readily understood upon reference to the annexed drawings, in which—

Figure 1 represents a perspective view of my rack, one end being shown in section; Fig. 2, a vertical cross-section of the rack with one side open and the other closed.

In constructing my rack I provide a series of upright posts, A, arranged in two parallel rows, the posts of each row being at a considerable distance from each other, and the two rows being at a distance apart equal to the width of the proposed rack. The corresponding posts of the opposite rows are connected at the base by means of sills or cross-pieces B, consisting of planks or boards set upon edge and nailed to the posts. These sills are each provided with two V-shaped notches or depressions in the top at the two ends, the notches of all the sills being arranged in line.

To the sills, within the notches, I nail crosswise of the sills continuous boards *a* in such manner as to form two troughs, C, extending the entire length of the rack along the two sides thereof.

Between the troughs upon the sills I nail an elevated board, D, upon which the attendant may walk lengthwise through the rack while distributing the feed therein.

To the inner sides of the upright posts A, on each side of the rack, I nail longitudinal boards E, the lower edges of which are at a considerable distance above the edges of the troughs.

To the upper edges of the boards E, I nail boards F, which rest upon and are sustained by the upper beveled ends of the posts.

To the inner sides of the boards E, near their lower edges, I nail inwardly and downwardly extending boards G, which serve as guards or fenders to throw the feed inward to prevent the hay-seed and other impurities from entering the fleece of the animals.

On the outer side of each board E, near the lower edge, I nail a narrow longitudinal strip, H, and below these strips I nail fast a series of narrow vertical strips or slats, I, arranged at a distance of a few inches apart and nailed at their ends to the boards H and the outer edge of the troughs C, respectively. The strips or slats serve as a means of separating the animals so that each may obtain its proper proportion of the food, and also to prevent the animals from introducing their heads too far into the rack, and to prevent the hay or other material from being drawn out in large quantities.

On each side of the rack I suspend by swinging links J a board, K, in such manner that the board may be lowered across the outside of the feed-openings, to prevent the animals from having access thereto, or elevated above the openings, so as to leave them exposed. One or more of the sustaining-links will be extended upward and fashioned into a handle, by means of which the attendant, standing either inside or outside of the rack, may raise and lower the guard-boards. For the purpose of sustaining the boards when elevated they are each provided with a spring-hook, L, which engages automatically over the upper edge of the rack whenever the board is raised.

The longitudinal troughs are designed more especially to receive and hold the grain or ground feed; but they also serve a useful purpose as receptacles for the chaff and seed from the hay.

It will be noted that the rack, constructed as described, affords feed-openings on both sides; that the two independent troughs prevent the animals on one side from obtaining the food from those on the other, and that by means of the central internal board the attendant is enabled to pass freely back and forth through the interior without stepping into the troughs.

I am aware that feed-racks having grated sides are old, and also that it is old to provide feed-racks with means for closing the feed-openings, and I lay no broad claim on either of said features.

I am aware that a feed-trough intended and adapted for the use of liquid and mash feeds has been provided with two longitudinal troughs, and two elevated walks above the same, with a central opening in the middle, through which the feed may be delivered into the troughs. This I do not claim.

It will be noted as a peculiarity of my rack that the open interior with the troughs arranged therein below and on opposite sides of the central walk, D, admits of the rack being used with equal advantage for mash-feeds and for hay, and that as both troughs are exposed from the interior, but not from the exterior, the attendant passing down the middle upon the walk therein has free access to the troughs without interference from the animals outside.

Having thus described my invention, what I claim is—

1. In a feed-rack provided with the series of side openings, the two longitudinal V-shaped troughs located wholly within the rack, and the elevated central walk, D, located between the troughs and serving also as a portion of the floor of the rack.

2. In combination with the body having the series of side openings, the guards K, the suspending-links, one or more of which have their ends extended upward, as shown, and the suspending-hooks L.

3. In combination with a feed-rack having a series of feed-openings in its sides, the guard-boards K, pivoted to the lower ends of pendent links J, and movable vertically by an endwise action, as described and shown.

FREDERICK A. NORTH.

Witnesses:
C. O. THOMPSON,
J. RICHARDS.